Feb. 6, 1968 Z. WIENCEK 3,368,030

COLOR TELEVISION SYNCHRONIZATION SYSTEM

Original Filed Aug. 8, 1958 3 Sheets-Sheet 1

PRIOR ART

INVENTOR.
ZBIGNIEW WIENCEK
BY Hofgren, Wegner, Allen, Stellman & McCord
Att'ys.

COLOR TELEVISION SYNCHRONIZATION SYSTEM

Original Filed Aug. 8, 1958 3 Sheets-Sheet 2

INVENTOR.
ZBIGNIEW WIENCEK
BY Hofgren, Wegner, Allen, Stellman & McCord
Attys.

COLOR TELEVISION SYNCHRONIZATION SYSTEM

Original Filed Aug. 8, 1958 3 Sheets-Sheet 3

INVENTOR.

ZBIGNIEW WIENCEK

BY Hofgren, Wegner, Allen, Stellman & McCord

Attys.

United States Patent Office 3,368,030

Patented Feb. 6, 1968

3,368,030
COLOR TELEVISION SYNCHRONIZATION SYSTEM

Zbigniew Wiencek, Palatine, Ill., assignor to Warwick Electronics Inc., a corporation of Delaware Original application Aug. 8, 1958, Ser. No. 753,927, now Patent No. 3,148,243, dated Sept. 8, 1964. Divided and this application June 30, 1964, Ser. No. 379,114
4 Claims. (Cl. 178—5.4)

ABSTRACT OF THE DISCLOSURE

Color television receiver circuitry in which the color reference oscillator is controlled through a closed loop by synchronizing information derived from the output of the R–Y synchronous detector. Synchronizing information from the B–Y synchronous detector is gated to an integrator which develops a control signal which is a function of the received signal strength. The control signal is utilized to control the gain of the chroma amplifier, including the action of the color killer.

This invention relates to novel chroma amplifier control circuitry for color television reception.

This application is a division of my application Ser. No. 753,927, now Patent No. 3,148,243, filed Aug. 8, 1958, and assigned to the assignee of this application.

The standard color television signal used for transmission in the United States includes, in addition to horizontal and vertical synchronizing and brightness information as in black and white television, chrominance or "chroma" information modulated on a subcarrier of approximately 3.58 megacycles, with the subcarrier suppressed. A short burst of 3.58 megacycle synchronizing information is provided, immediately following the horizontal synchronizing pulse in the time sequence of the signal. Most color television receivers utilize synchronous detectors to demodulate the chroma information, and include a local oscillator synchronized with the 3.58 megacycle synchronizing signal to effect the demodulation.

It is essential to the reproduction of the hue of the picture that the oscillator be accurately synchronized with the synchronizing signal, with respect to both phase and frequency. The amplitude of the chroma information determines the "saturation" of the picture, i.e., whether colors are vivid or pale, and it is necessary that the amplitude of the signals applied to the cathode ray tube be properly regulated to reproduce the televised scene accurately.

One object of the invention is the provision of an improved chroma gain control circuit.

Another object is to provide improved circuitry including amplifying means for the received signal, detector means for deriving the desired picture information from the signal, and means, connected to the output of the detector means and responsive to the amplitude of the demodulated control information in the output, for controlling the gain of the amplifying means. Yet a further object is to provide improved circuitry in which the amplitude of the synchronizing signal appearing in the detector output is utilized to condition the receiver for color operation in the presence of such signal and for conditioning the receiver for black and white operation in the absence of the signal.

Further objects and advantages will become apparent from the following detailed description taken in connection with the accompanying drawings, in which.

Figure 1:
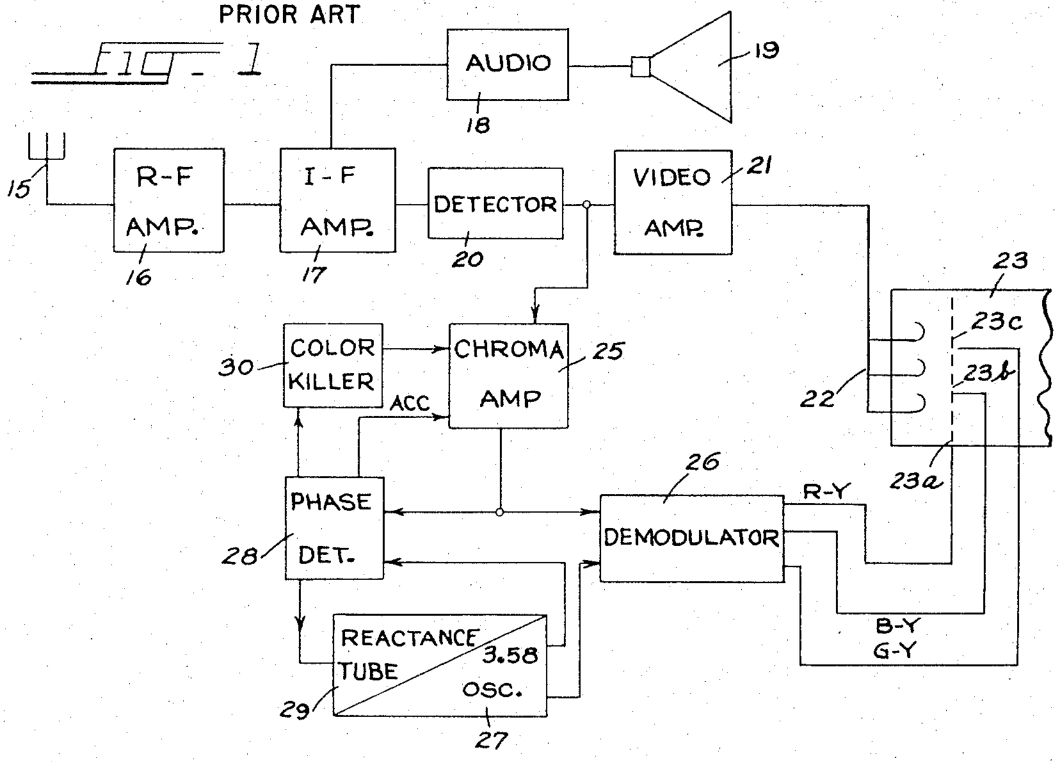
FIGURE 1 is a block diagram of a color television receiver.

While this invention is susceptible of embodiments in many different forms, there is shown in the drawings and will herein be described in detail several embodiments of the invention with the understanding that the present disclosure is to be considered as an exemplification of the principles of the invention and is not intended to limit the invention to the embodiments illustrated. The scope of the invention will be pointed out in the appended claims.

In FIGURE 1, one form of a basic color television receiver is illustrated in a block diagram. A transmitted signal is received by antenna 15 and amplified in radio frequency and intermediate frequency amplifiers 16 and 17. The audio information is separated from the picture information of the signal, detected and amplified in suitable circuits 18, and coupled to the speaker 19. The amplified intermediate frequency video signal from intermediate frequency amplifier 17 is coupled to a video detector 20 which has two outputs. The first output represents the brightness of the picture and is coupled to a video amplifier 21 and to the cathodes 22 of tricolor cathod raytube 23. The amplitude of the signal applied to the cathodes determines the brightness of the image displayed on the screen, ranging from black to white. The second output derived from video detector 20 represents the color information for the signal including the phase and amplitude modulated information indicating hue and saturation, and the 3.58 megacycle synchronizing burst; and is connected to a chroma amplifier 25. The amplified chroma signal is connected to a synchronous demodulator or detector 26, which includes mixing or matrix circuits and has three outputs providing red (R–Y) information to control grid **23*a*, blue (B–Y) information to control grid 23*b*, and green (G–Y) information to control grid 23*c***.

A local oscillator 27, generally crystal controlled, provides the 3.58 megacycle synchronizing signal for the synchronous detector 26. A portion of the output of the oscillator is coupled to a phase detector 28, to which is also fed a portion of the output of chroma amplifier 25. The phase detector compares the oscillator phase and frequency with the synchronizing signal information in the output of the chroma amplifier and provides a correction signal to reactance tube 29, to keep the oscillator properly synchronized with the synchronizing information from the incoming signal.

The phase detector has two additional functions. First, it provides an automatic chroma control signal in the form of a gain control signal to the chroma amplifier. Second, it controls a color killer 30 which renders the chroma amplifier 25 inoperative in the absence of the incoming color information, in which event the receiver functions as a black and white set with the picture produced by the brightness information applied to the cathodes 22 of the cathode ray tube.

A problem in the basic circuit outlined above is found in the control of the chroma amplifier. The automatic gain control circuit is of insufficient accuracy to maintain the proper chroma amplitudes in the reproduced picture, without the use of a manual "chroma gain" control.

Figure 4:
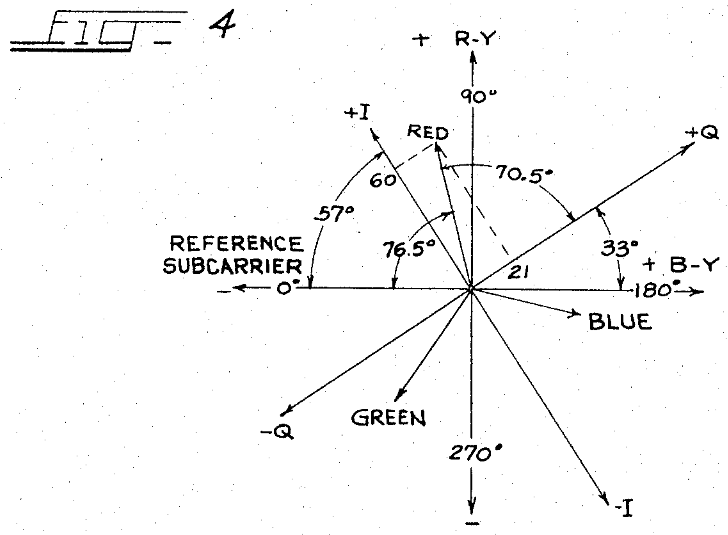
FIGURE 4 is a vector diagram illustrating the relationships of various signals and axes discussed herein.

The vector diagram in FIGURE 4 illustrates the relationships of the R–Y, B–Y, I and Q axes, the reference subcarrier and the basic colors.

Figure 2:
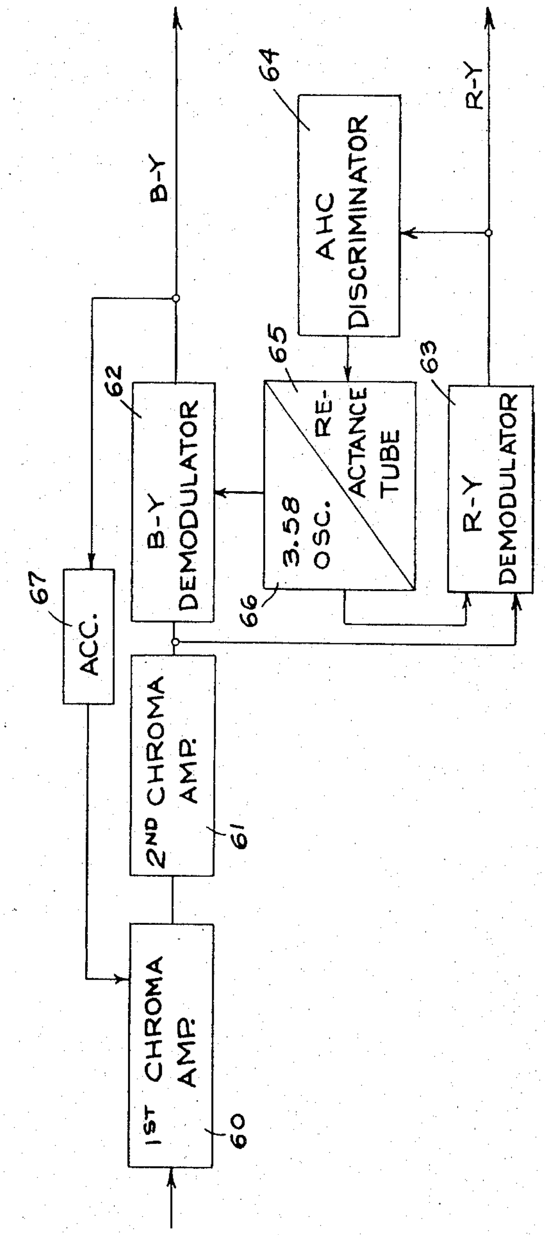
FIGURE 2 is a block diagram of a preferred embodiment of the invention.

FIGURE 2 illustrates a preferred embodiment of the invention in which the local oscillator is controlled by the absolute value of the synchronizing information appearing in the output of a single synchronous detector or demodulator. Again, the video information from the video detector is amplified by first and second chroma amplifiers 60 and 61. The output of the second chroma amplifier is coupled to B–Y and R–Y synchronous detectors 62 and 63, respectively. Reference to FIGURE 4 shows that the local oscillator synchronizing information or reference subcarrier has a quadrature relationship with the R–Y axis. Therefore, if the local oscillator is properly synchronized, no synchronizing information appears in the R–Y demodulator output. If the phase shifts toward red, the synchronizing information appears as a positive signal in the R–Y output, while if it shifts toward green the information appears as a negative signal. This positive and negative synchronizing information resulting from a phase or frequency error is utilized in an AHC (automatic hue control) discriminator 64 to control reactance tube 65, and thus the phase and frequency of local oscillator 66.

The local oscillator synchronizing information or reference burst has a constant predetermined amplitude relative to the chroma information in the video signal from the transmitter. As shown in FIGURE 4, the reference burst is 180° out of phase with the B–Y signal, and accordingly, the synchronizing information appears as a negative voltage in the output of the B–Y demodulator. As the phase and frequency of the oscillator are maintained accurately in synchronism with the phase and frequency of the reference burst in the synchronous detector output by the AHC circuit, any variation in burst amplitude in the output of the B–Y demodulator is due solely to variations in the amplitude of the signal to the demodulator, as from variations in the received signal, or in the amplification of the various stages in the receiver. Accordingly, the burst information in the output of the B–Y demodulator is utilized in an ACC (automatic chroma control circuit) 67 to control the gain of the chroma amplifier. The control information is sufficiently accurate that a manual "Chroma" control for the user of the receiver is rendered unnecessary, the saturation of the colors automatically being accurately reproduced.

In some cases it is desirable that the output of the synchronous detector means be amplified before it is applied to the cathode ray tube. In this event, it is preferable that the burst information for control be obtained from the output of the demodulation product amplifier, compensating for phase shifts in the amplifier and insuring proper phase conditions at the grids of the cathode ray tube. In the following discussion in both the specification and claims, when mention is made of securing synchronizing or control information from the output of the demodulator or synchronous detector, it will be understood that this may mean either from the actual demodulator output circuit, or from the output of amplifiers, or from the grids of the picture tube.

Figure 3:
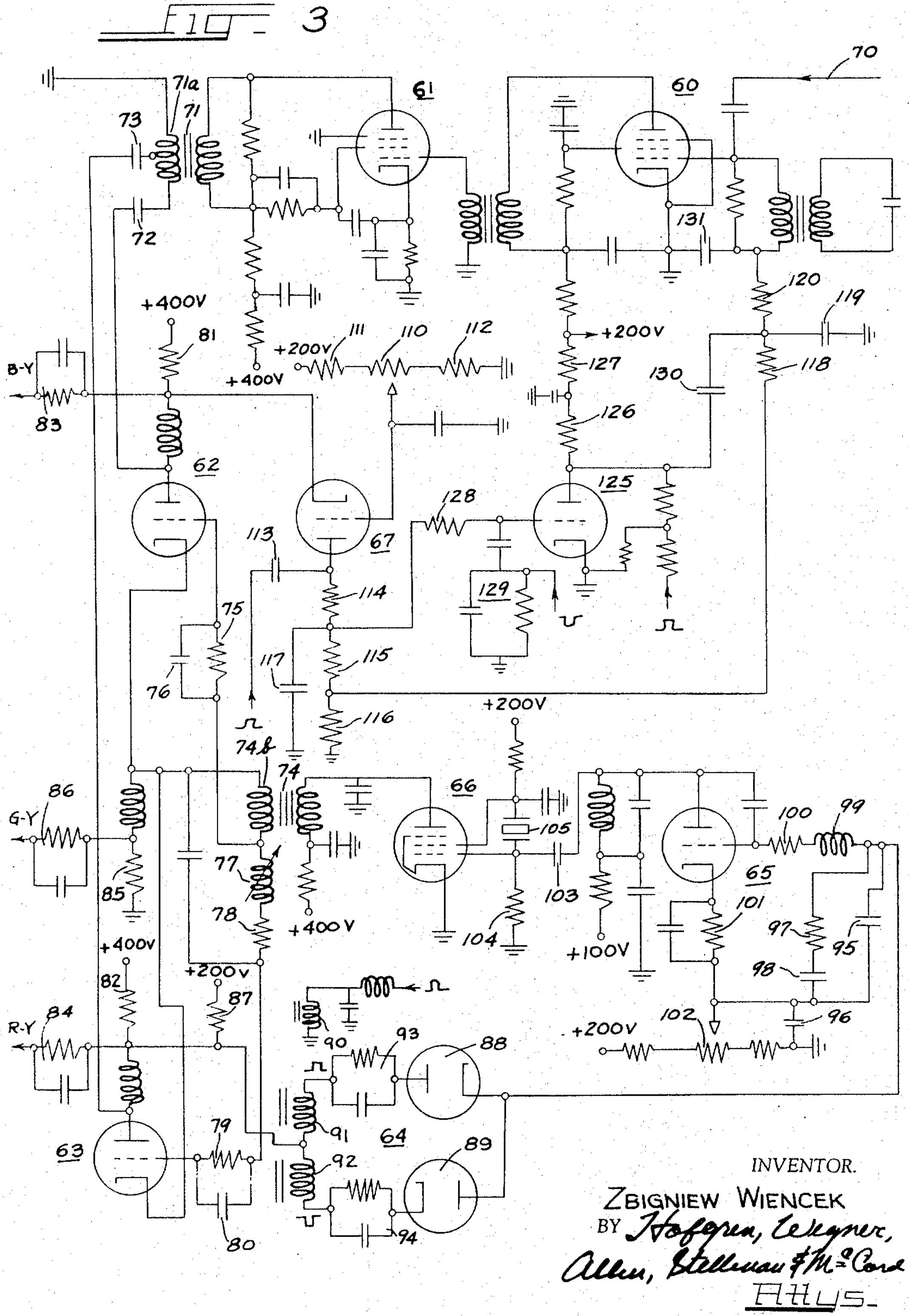
FIGURE 3 is a schematic diagram of the block diagram of FIGURE 2.

Referring now to FIGURE 3, a schematic diagram of the embodiment of the invention of FIGURE 2 will be described. Values for circuit elements and tube types for a typical operative circuit will be given. However, to avoid unnecessary detail only the values of components in those circuits which are particularly designed for operation in accordance with the invention will be given. In most cases, the B supply potential for the various stages is merely noted on the drawing. It is to be understood that this circuit is described in detail in order to disclose an operative embodiment of the invention and that many changes and modifications will be apparent to those skilled in the art.

The signal from the video detector is coupled through a blocking capacitor to the grid circuit of first chroma amplifier 60, one-half of a 6AN8. The output of first stage of amplification is transformer coupled to the control grid of second or output chroma amplifier 61, a 6CL6. The proper amplitudes of the chroma signal are obtained from a secondary winding **71*a*** of the output transformer

71 and are coupled through blocking capacitors 72 and 73, each 27 μμf. (micromicrofarads), to the B–Y and R–Y synchronous detectors 62 and 63, respectively, each one-half of the 12BH7. The chroma signal is applied directly to the plate of each of the synchronous detectors, while the synchronizing signals from the local oscillator 66 are applied to the control grid thereof. The crystal controlled oscillator 66 has an output transformer 74 connected in the plate circuit, with secondary winding **74*b* having one terminal returned to the cathodes of the synchronous detectors 62 and 63 which are connected together. The reference oscillation or synchronizing signal derived across the secondary winding is coupled through a circuit made up of a parallel combination of resistor 75, 10,000 ohms, and capacitor 76, .02 μf., to the control grid of the B–Y detector 62. The synchronizing signal for the R–Y detector 63 is coupled through a phase shifting network including variable inductor 77 and resistor 78, and a biasing circuit including resistor 79, 10,000 ohms, and capacitor 80, .06 μf., to the control grid of R–Y detector 63. The B–Y and R–Y chroma information is developed across plate load resistors 81, 39,000 ohms, and 82, 16,000 ohms, of the B–Y and R–Y detectors, respectively. This information is coupled through identical circuits 83 and 84, each including a 100,000 ohm resistor in parallel with a .02 μf. capacitor, to the respective grids of the cathode ray tube. The G–Y information is derived across a 6800 ohm resistor 85 in the common cathode circuit for demodulators 62 and 63, and is likewise coupled through a resistance-capacitance circuit 86** to the proper grid of the cathode ray tube.

The anode circuit of R–Y detector 63 is connected to the juncture between resistors 82 and 87, 27,000 ohms, which together with the tube circuit form a voltage divider connected between the 400 volt and 200 volt B supplies, and the R–Y information for the cathode ray tube is derived from this point. In addition, the synchronizing signal information fed to the AHC discriminator 64 is also obtained at this juncture point. The discriminator 64, in this embodiment of the invention, takes the form of a gated, bidirectional switch including a pair of diodes 88 and 89, the two halves of a 6AL5. The bidirectional switch is turned on or "gated" at the appropriate time by a pulse applied to the primary winding 90 of a coupling transformer, and derived from the horizontal fly-back pulse. The coupling transformer has two secondary windings 91 and 92 connected in series, with the burst information from the R–Y detector fed to the juncture between them. The secondary windings 91 and 92 are so phased that they render both of the reversely connected diode sections conductive during the pulse period, a positive pulse being applied to the anode of diode 88 and a negative pulse being applied to the cathode of diode 89. Interposed between the terminals of transformer windings 91 and 92 in the associated elements of the diodes are identical resistance-capacitance circuits 93 and 94, each including a 47,000 ohm resistor connected in parallel with a 0.2 μf. capacitor.

If the oscillator is properly phased with synchronizing signal, there is no synchronizing signal appearing in the output of the R–Y demodulator 63 and there is no output from the discriminator 64, as the diodes conduct substantially equally. However, with a shift of the phase of the burst from quadrature relation with the R–Y axis, one or the other of the diodes will conduct more heavily providing an output which is utilized to control reactance tube 65. In this embodiment of the invention, a shift of the burst toward red provides a positive burst output in the R–Y detector, causing diode 88 to conduct more heavily; while a shift toward green provides a negative output causing diode 89 to conduct more heavily. The output from the discriminator, which appears at the connection between the cathode of diode 88 and the anode of diode 89, is integrated by a circuit including capacitor 95, 0.005 μf., connected between the discriminator output and ground through capacitor 96, 0.02 μf., and connected in parallel with the series combination of a resistor 97, 15,000 ohms, and capacitor 98, 0.2 μf. The integrated control potential is applied through choke 99 and resistor 100, 2200 ohms, to the control grid of the reactance tube 65, one-half of a 6U8. The cathode of the control tube is returned through a bypassed resistor 101 to the adjustable tap of a potentiometer 102 connected in a voltage divider between the 200 volt B supply and the ground, to adjust the nominal operating point of the tube. The reactance tube is connected through a capacitor 103, 200 μμf., with the control grid of the oscillator 66, the pentode section of the 6U8. The control grid is returned to ground through resistor 104, 100,000 ohms. A crystal 105, which sets the operation of the oscillator at approximately 3.58 megacycles, is connected between the control and screen grids, the screen grid acting as an anode for the oscillator section. The output of the local oscillator is derived from the plate circuit through coupling transformer 74, as previously described.

The chroma information from the B–Y demodulator 62 is coupled to the cathode of an automatic chroma control (ACC) gate tube 67, one-half of a 6AN8. The control grid of the gate tube is returned to the movable tape of a potentiometer 110, 4000 ohms, interposed between resistor 111, 400,000 ohms, and resistor 112, 6500 ohms, connected across the 200 volt B supply, to adjust the operating level of the stage. A synchronizing or gate pulse is applied through blocking capacitor 113 to the plate of the gate tube which is in turn connected to ground through three series connected resistors, 114, 470,000 ohms, 115, 470,000 ohms, and 116, 100,000 ohms. A capacitor 117, 0.2 μf, shunts resistors 115 and 116.

The gate pulse applied to the plate, which is also derived from the fly-back pulse of the horizontal sweep circuit, coincides in time with the synchronizing information or reference burst of the chroma signal, and renders tube 67 conductive only during the occurrence thereof, preventing the chroma signal from affecting the ACC circuit. As pointed out above, the AHC circuits operate to maintain the phase of the synchronizing information burst in quadrature relation with the R–Y axis, and thus in phase, although negative in sign, with respect to the B–Y axis. Accordingly, any variation in amplitude of the reference burst in the output of the B–Y detector from a phase shift is eliminated, and such variation as is present is due entirely to changes in strength of the signal being received and in the amplification of the receiver. Accordingly, this information is used to provide an automatic gain control signal for the first chroma amplifier 60.

The control voltage is derived, in integrated form, across resistor 116 and coupled through a circuit including series resistor 118, 100,000 ohms, shunt capacitor 119, 47 μμf., resistor 120, 3300 ohms, to the control grid circuit of chroma amplifier 60. As the synchronizing or burst signal at the transmitted is maintained at a constant amplitude, and the operation of the AHC and ACC circuits keeps its amplitude constant in the output of the B–Y demodulator, the chroma signals appearing in each of the three circuits B–Y, G–Y and R–Y, are an accurate representation of the transmitted chroma information so that the saturation of the colors is accurately reproduced by the cathode ray tube, without the need for manual adjustment of the viewer. It is only necessary that the operating level of ACC gate tube 67 be properly set by adjusting resistor 110, either at the factory or by the serviceman.

The information from ACC gate tube 67 is also used to control the operation of the color killer 125, one-half of a 6AN8. The color killer is supplied with a positive gate pulse applied to the anode, which is also connected through resistors 126, 50,000 ohms, and 127, 10,000 ohms, to a 200 volt B+ supply, and a negative gate pulse, applied to the control grid. The integrated burst or synchronizing information from the B–Y detector, developed across both resistors 115 and 116 is applied to the control grid of the color killer through resistor 128, 470,000 ohms. With a color signal being received, the negative potential across resistors 115 and 116 and applied to the control grid of the color killer tube 125 is sufficient to keep the tube cut off, in which event the first chroma amplifier 60 operates under the control of the ACC signal applied to the grid circuit. When a black and white signal is being received, the negative bias on the control grid of the color killer tube is reduced so that the tube conducts. With this operation, the negative gate signal applied through resistance-capacitance network 129 to the control grid appears in amplified form in the plate circuit as a positive pulse. The effect of this pulse is enhanced by the simultaneous appearance of the positive gate pulse applied to the plate. The resulting positive pulse, which is of substantial amplitude, is coupled through the capacitor 130, 0.01 μf., and resistor 120 to the control grid circuit of the first chroma amplifier. These positive pulses cause the grid to go positive, drawing grid current which charges capacitor 131, 100 μμf., cutting the chroma amplifier off.

I claim:

1. In a color television receiver for a signal containing chroma information phase modulated on a subcarrier and a periodic color reference signal having a constant amplitude relative to the amplitude of the chroma information and 180° out of phase with the B–Y component thereof, a color reference oscillator synchronized with said color reference signal, a chroma signal amplifier and synchronous chroma demodulator means including a demodulator operating in phase with the B–Y chroma component and having an output, the improvement which comprises: a gating circuit having an input connected with the output of said B–Y detector and passing only detected information occurring during the period of the color reference signal; an integrator connected with the output of said gating circuit; and means connected between said integrator and the chroma amplifier to control the gain thereof as a function of the integrated B–Y information passed by said gating circuit.

2. The color television receiver circuitry of claim 1 wherein said chroma amplifier includes an amplifying device with control element and a variable gain characteristic as a function of the voltage applied to the control element, and said control element is connected with said integrator.

3. The color television receiver circuit of claim 1 including means for rendering said chroma amplifier insensitive to chroma information, said means having a control element connected with said integrator and having levels of integrated signal above which said chroma amplifier is operative and below which said chroma amplifier is inoperative.

4. The color television receiver circuit of claim 1 in which the chroma amplifier includes an amplifying device with a control element and a variable gain characteristic as a function of the voltage applied to the control element, the gate circuit has an integrator load with a resistor connected in parallel with a capacitor, the control element being connected across a portion of the resistor of said integrator, and a color killer circuit including a first means for applying a pulse to the control element of the chroma amplifier during occurrence of the color reference signal, tending to increase the gain of the amplifier, and a second means for applying a pulse to the control element of the chroma amplifier, the combined amplitude of said pulses being sufficient to charge a blocking circuit in the amplifier, said second circuit including a device having a control element connected with said integrator and cut off by the integrated signal in the presence of a color reference signal.

(References on following page)

References Cited

UNITED STATES PATENTS

| | | | |
|---|---|---|---|
| 2,766,321 | 10/1956 | Parker | 178—5.4 |
| 2,848,537 | 8/1958 | Richman | 178—5.4 X |
| 2,880,266 | 3/1959 | Parker | 178—5.4 |
| 2,883,452 | 4/1959 | Macovski | 178—5.4 |
| 2,951,115 | 8/1960 | Ionnuzzi et al. | 178—5.4 |
| 2,954,425 | 9/1960 | Richman | 178—5.4 |
| 2,982,812 | 5/1961 | Rhodes et al. | 178—5.4 |

ROBERT L. GRIFFIN, *Primary Examiner.*

DAVID G. REDINBAUGH, JOHN W. CALDWELL, *Examiners.*

J. A. O'BRIEN, R. MURRAY, *Assistant Examiners.*